United States Patent
Wallace et al.

(10) Patent No.: US 10,587,105 B2
(45) Date of Patent: Mar. 10, 2020

(54) SNOW/ICE REMOVAL DEVICE FOR OVERHEAD LINES

(71) Applicant: Snowrid Lines Systems Limited, Temuka (NZ)

(72) Inventors: Bruce Lindsay Wallace, Temuka (NZ); Peter Lance Wallace, Temuka (NZ)

(73) Assignee: Snowrid Lines System Limited, Temuka (NZ)

( * ) Notice: Subject to any disclaimer, the term of this patent is extended or adjusted under 35 U.S.C. 154(b) by 0 days.

(21) Appl. No.: 16/305,253

(22) PCT Filed: May 23, 2017

(86) PCT No.: PCT/NZ2017/050069
§ 371 (c)(1),
(2) Date: Nov. 28, 2018

(87) PCT Pub. No.: WO2017/209629
PCT Pub. Date: Dec. 7, 2017

(65) Prior Publication Data
US 2020/0014185 A1    Jan. 9, 2020

(30) Foreign Application Priority Data

May 30, 2016  (NZ) ........................................ 720659

(51) Int. Cl.
*H02G 7/05*   (2006.01)
*H02G 7/16*   (2006.01)

(52) U.S. Cl.
CPC ..................... *H02G 7/16* (2013.01)

(58) Field of Classification Search
CPC ................... H02G 7/12; H02G 7/16
(Continued)

(56) References Cited

U.S. PATENT DOCUMENTS 2,121,478 A   6/1938   Dorman
2,453,361 A   11/1948  Clement
(Continued)

FOREIGN PATENT DOCUMENTS

FR         672443      8/1992
GB         115417 A    2/1919
WO     WO-2017209629 A1 * 12/2017    ............... H02G 7/16

OTHER PUBLICATIONS

International Search Report for International Application No. PCT/NZ2017/050069 dated Aug. 2, 2017 (3 pages).
(Continued)

*Primary Examiner* — Todd M Epps
(74) *Attorney, Agent, or Firm* — Merchant & Gould P.C.

(57) ABSTRACT

A utility line snow or ice removal device mounts to a support structure, such as a utility pole cross-arm. The device includes a moving support arranged to support a utility line, such that a combined weight of the utility line and any snow or ice on the utility line is borne by the moving support. A release arrangement is configured to maintain the moving support in a first position when the combined weight is below a release threshold. When the combined weight exceeds the release threshold, the release arrangement is arranged to release the moving support from the first position to allow the utility line to move under the combined weight from the supported position, creating a sudden movement of the utility line that shakes snow/ice build-up from the line. The device also includes a resetting arrangement configured to return the moving support to the first position when snow/ice has been removed.

20 Claims, 9 Drawing Sheets

(58) Field of Classification Search
USPC .............. 248/65, 63, 73, 683, 206.5, 309.4;
174/40 R, 44; 60/646, 657; 241/36, 283, 241/301
See application file for complete search history.

(56) References Cited

U.S. PATENT DOCUMENTS

| | | |
|---|---|---|
| 3,035,111 A | 5/1962 | Mead |
| 4,212,378 A | 7/1980 | Hrovat |
| 5,411,121 A | 5/1995 | LaForte et al. |
| 6,138,930 A | 10/2000 | Gagnon et al. |
| 6,518,497 B1 | 2/2003 | Allaire et al. |
| 6,660,934 B1 | 12/2003 | Nourai et al. |
| 7,310,948 B2 * | 12/2007 | Shirmohamadi ........ H02G 7/16 60/646 |

OTHER PUBLICATIONS

International Written Opinion for International Application No. PCT/NZ2017/050069 dated Aug. 2, 2017 (6 pages).
Volat et al. "De-icing/Anti-icing Techniques for Power Lines: Current Methods and Future Direction." IWAIS XI, Jun. 2005, pp. 1-11.
Unknown. "Systems for prediction and monitoring of ice shedding, anti-icing and de-icing for power line conductors and ground wires." Working Group Article B2.20. CIGRE Publication—Dec. 2010, 100 pages.

* cited by examiner

SNOW/ICE REMOVAL DEVICE FOR OVERHEAD LINES

This application is a National Stage Application of PCT/NZ2017/050069, filed 23 May 2017, which claims benefit of Serial No. 720659, filed 30 May 2016 in New Zealand and which applications are incorporated herein by reference. To the extent appropriate, a claim of priority is made to each of the above disclosed applications.

FIELD

The invention relates to removal of snow and/or ice build-up from overhead lines.

BACKGROUND

Snow or ice build-up on utility lines is responsible for numerous failures every year. The weight of snow or ice causes lines to break or utility poles, cross-arms or other fittings to fail.

Such failures are costly, due to utility outages and the costs of repair. Power outages of many hours and even days are common in some areas.

While proposals have been made for automated devices that operate to remove snow or ice from utility lines, to the Applicant's knowledge none of these has been successful.

U.S. Pat. No. 3,035,111 discloses a device that fits between the cross-arm of a utility pole and an insulator carrying an electricity line. However, the device relies on a complex mechanism that is unlikely to work well in icy conditions and is unlikely to survive many years in field conditions. Further, this device is unsuitable for retrofitting to existing poles and insulators and will create unacceptable twisting forces on the cross-arm.

Reference to any document in this specification does not constitute an admission that it is prior art, validly combinable with other documents or that it forms part of the common general knowledge.

It is an object of the invention to provide an improved method and/or device and/or system for removal of snow and/or ice from utility lines, or at least to provide the public with a useful choice.

In this specification the term "utility lines" refers to overhead lines or cables, such as power or electricity lines, telecommunications lines (including Internet lines), cable television lines and the like.

SUMMARY

In one aspect the invention provides a utility line snow or ice removal device including: a body; a mount configured for mounting of the body to a support structure; a moving support mounted to or in the body and arranged to support a utility line, such that a combined weight of the utility line and any snow or ice on the utility line is borne by the moving support, the moving support having a first position in which the utility line is supported by the moving support in a supported position; a magnetic arrangement configured to maintain the moving support in the first position when the combined weight is below a release threshold, wherein, when the combined weight exceeds the release threshold, the magnetic arrangement is configured to release the moving support from the first position to allow the utility line to move under the combined weight from the supported position; and a resetting arrangement configured to return the moving support to the first position, thereby returning the utility line to the supported position.

Preferably the moving support is arranged to move vertically, and the supported position is a raised position.

Alternatively, the moving support may be arranged to move horizontally, and the supported position is a retracted position.

Preferably the utility lines are electrical power lines, telecommunications lines, Internet lines or cable television lines.

Preferably the utility lines are suspended overhead utility lines.

Preferably the support structure includes a utility pole. Preferably the support structure includes a cross-arm mounted on the utility pole and the mount is configured for mounting of the body to the cross-arm. Preferably the mount includes at least two perpendicular faces configured to lie against two faces of the cross-arm.

Preferably the moving support is arranged to support the utility line by supporting an insulator to which the utility line is mounted or attached.

Preferably the magnetic arrangement includes one or more magnets mounted in the body.

Preferably at least one of the one or more magnets has an adjustable position, which allows the magnetic force and thereby the release threshold to be adjusted.

At least one of the one or more magnets may be replaceable to allow the release threshold to be altered.

Preferably the magnetic arrangement is configured to release the moving support from the first position suddenly.

Preferably the movement of the utility line under the combined weight from the supported position suddenly releases energy that causes physical movement along the length of the utility line to remove snow and/or ice build-up.

Preferably the release threshold corresponds to a desired maximum combined weight of the utility line and any snow or ice build-up.

Preferably the resetting arrangement includes one or more springs applying a resetting force. Preferably the resetting arrangement includes an even number of springs forming two groups of springs having opposite coil directions.

Preferably the resetting arrangement includes two springs having opposite coil directions.

Preferably the resetting arrangement applies a resetting force that is higher than a weight force applied by the bare utility line and lower than the release threshold.

Preferably the device is self-contained and requires no electrical input.

This aspect of the invention also extends to a method of removing snow and/or ice build-up from a utility line that is supported by a plurality of support structures, the method including using a device as described above to support the utility line on at least some of the support structures. Preferably the device is used on at least every second support structure.

In another aspect the invention provides a utility line snow or ice removal device including: a body; a mount configured for mounting of the body to a support structure; a moving support mounted to the body and arranged to support a utility line, such that a combined weight of the utility line and any snow or ice on the utility line is borne by the moving support, the moving support having a first position in which the utility line is supported by the moving support in a supported position; a release arrangement configured to maintain the moving support in the first position when the combined weight is below a release threshold, wherein, when the combined weight exceeds the release threshold, the release arrangement is arranged to release the moving support from the first position to allow the utility line to move under the combined weight from the supported position; and a resetting arrangement configured to return the moving support to the first position, thereby returning the utility line to the supported position.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e., they will be taken to mean an inclusion of the listed components which the use directly references, and possibly also of other non-specified components or elements.

BRIEF DESCRIPTION OF THE DRAWINGS

The invention will now be described, by way of example only, with reference to the accompanying drawings, in which.

DETAILED DESCRIPTION

FIGS. 1 to 4 show a snow and/or ice removal device 1 according to one embodiment. The device 1 includes a body 2 and a mount 3 (see FIG. 3) for mounting of the body to a support structure.

Figure 4:
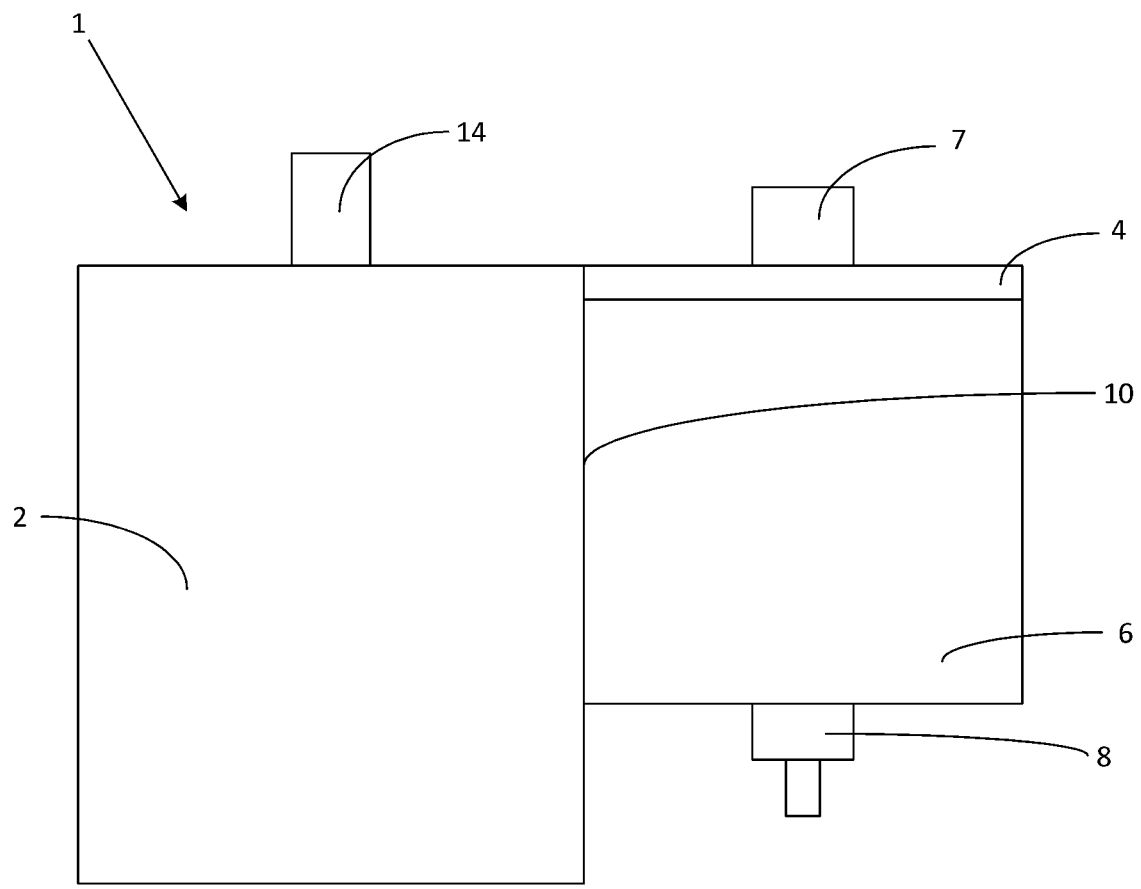
FIG. 4 shows how the device of FIG. 1 may be mounted to a support structure, such as a utility pole cross-arm.

In the embodiment shown the mount 3 includes a plate 4 that extends horizontally from the body 2. A slot or aperture 5 is provided to receive a bolt for attachment to the support structure. FIG. 4 is a side view showing how the device 1 may be mounted to a support structure, such as a cross-arm 6 on a power pole. The cross-arm 6 may be an existing cross-arm to which the device 1 is retrofitted. A bolt 7 passes through the slot or aperture 5, through a hole in the cross-arm 6 and engages with a nut 8. Where a slot 5 is provided, some adjustment of the position relative to the cross-arm is possible, since the slot 5 can slide relative to the bolt 7 before it is tightened.

As shown in FIG. 4, the mount may include the plate 4 and also a side wall 10 of the body 2. The perpendicular faces of the plate 4 and side wall 10 lie along corresponding faces of the cross-arm 6, which together with the bolt 7 provides a solid mounting of the device 1 to the cross-arm 6. Preferably the mounting is rigid and free of gaps. This helps to prevent any twisting of the device relative to the cross-arm.

In other embodiments the mount may include a further plate, lying along the bottom face of the cross-arm 6 and including a slot or aperture through which the bolt will pass. The mount will then have plates lying along both top and bottom of the cross-arm. However, this requires a known dimension of the cross-arm 6.

The skilled reader will appreciate that various mounting configurations may be used. Further, different mounting arrangements may be required for different applications. Desirably the mounting arrangement should provide a rigid mounting of the device to the support structure.

Returning to FIG. 1, the device 1 includes a moving support 14. An upper end 15 of the moving support 14 is configured to support a utility line. In preferred embodiments the moving support 14 is configured to support a conventional insulator to which the utility line is mounted or attached. For example, the moving support may have any required formation at its upper end for mounting of any suitable type of insulator. Suitable formations may include: tapered inserts, threaded holes for receiving through bolts, a flat base plate carried on the top end of the moving support, eyelets, or any other formation required for retro-fitting to a specific type of insulator.

In typical power line applications, the line passes over the top of the insulator and is attached to the insulator by two lacing wires. However, different types of insulators and different means of mounting the line to the insulator are used in different applications and the invention is not limited in this respect.

The moving support 14 slides within a sleeve 16 mounted to a top wall 17 of the body 2. The sleeve 16 extends through an aperture in the top wall 17. This forms a tight sliding arrangement, which tends to resist penetration of snow/ice into the body of the device 1.

The moving support 14 also passes freely through an aperture in a fixed magnet bearer 18.

A lower end of the moving support 14 sits on or is attached to an actuation member 20. The actuation member transmits the forces applied by the release arrangement, resetting arrangement and the moving support. In embodiments relying on magnetic force, at least part of the actuation member 20 should be formed from a ferromagnetic material, or have a magnetic or ferromagnetic element mounted to it.

In the embodiment shown the actuation member 20 may have a generally T-shape and be arranged to receive a magnetic force applied by a magnet 21 and spring forces applied by springs 22, 23, as well as the force from the moving support 14. In some embodiments one or more of the functions of the actuation member 20 may simply be filled by a part of the moving support, or by a member formed integrally with the moving support.

In an unloaded state (i.e. free of any snow and/or ice buildup on the utility line) the weight of the utility line is borne by the moving support. However, the device maintains the moving support in the first position shown in FIG. 1. In this raised or extended position, the utility line is also maintained in a supported or raised position.

The attractive magnetic force between the magnet 21 and the actuation member 20 is sufficient to resist the downward force applied by the weight of the utility line, insulator and moving support. In some embodiments this may be assisted by upwards force from the springs 22, 23. However, as will be explained below, this is not the primary function of the springs 22, 23.

Figure 2:
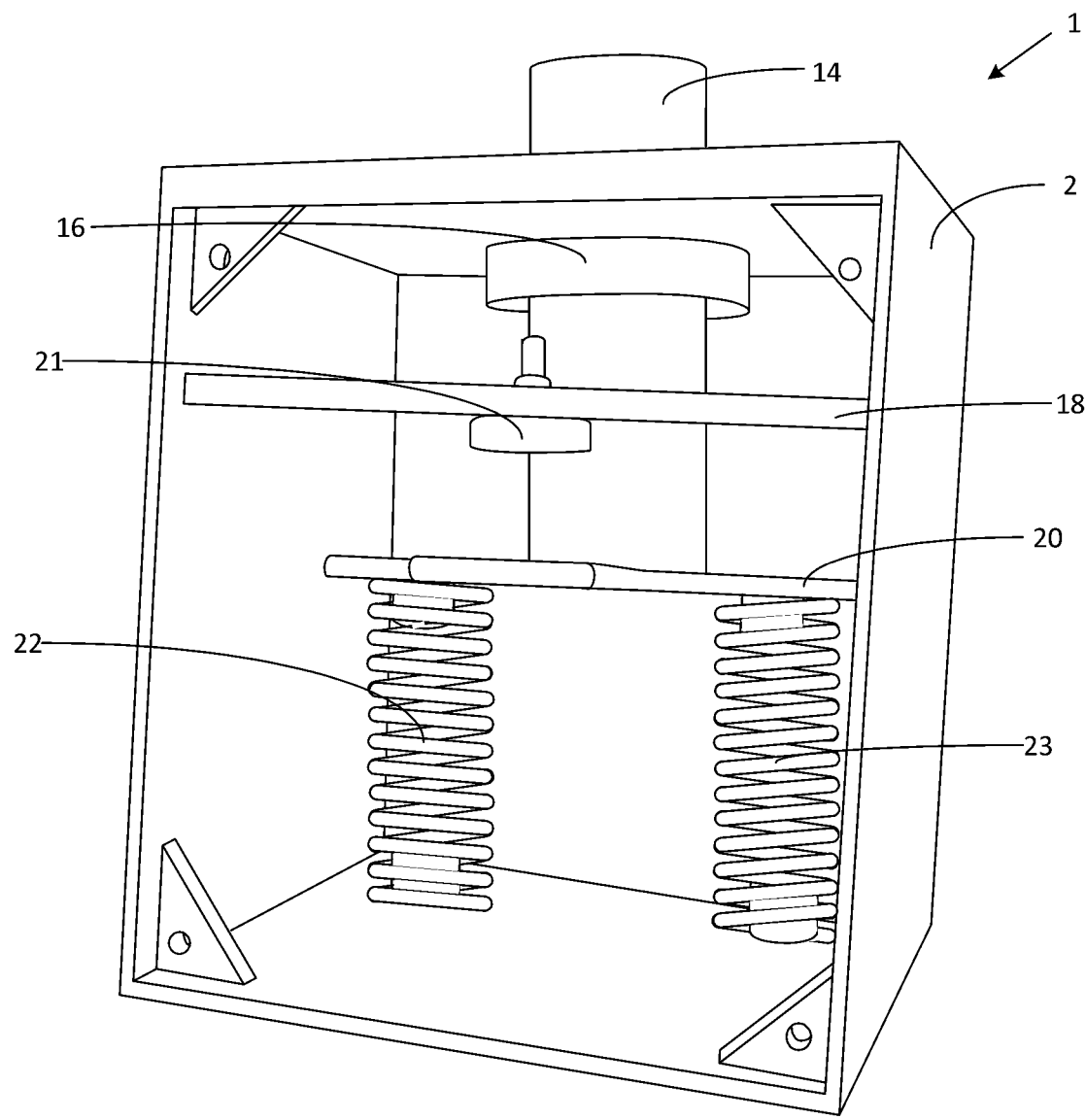
FIG. 2 shows the device of FIG. 1, in a released position.

In snowy or icy conditions, snow or ice will gradually build up on the utility line. The combined weight of the utility line and snow/ice buildup increases until a release threshold is reached. At this release threshold, the weight force is sufficient to overcome the attractive force between the magnet 21 and actuation member 20. The actuation member is therefore released and moves downwards under the weight force, as shown in FIG. 2. The moving support 14, insulator and utility line are also released and move downwards under the weight force.

In other words, the device maintains the utility line in a supported or raised position until snow/ice buildup is sufficient to increase the combined utility line and snow/ice weight above the release threshold. At this point, the moving support is released and the utility line is allowed to fall under its own weight. Further, the release is very sudden. When the magnetic force is overcome, it releases quickly. This creates a very sudden drop in the utility line position, with a resulting generation of energy that moves through the utility line. This energy reflects back along the line from an adjacent support structure. The resulting sudden and energetic movement from both the initial movement of energy along the utility line and subsequent reflections of that energy is sufficient to shake most snow/ice buildup from the utility line.

The device 1 therefore maintains the utility line in a supported or raised position until a weight threshold is reached and then releases the utility line, allowing it to fall under the combined weight of the utility line and snow/ice buildup on the utility line. This can be contrasted with systems relying on striking the line for example.

In the Applicant's device 1, if snow/ice is effectively removed from the utility line, the bare weight of the utility line or the combined weight of the utility line and any remaining snow/ice will be below the release threshold, and also below a resetting threshold. The resetting threshold is governed principally by the springs 22, 23 and should be greater than the bare weight of the utility line weight and less than the release threshold.

When the moving support 14 moves downwards as shown in FIG. 2, it compresses the springs 22, 23. The compression of the springs created an upwards resetting force. When the line weight drops below the resetting threshold, the resetting force is sufficient to move the moving support upwards such that the magnetic arrangement can reengage and the moving support 14 and actuation member 20 return to the supported position of FIG. 1.

On occasion the operation of the device may not remove sufficient snow/ice from the utility line, such that the combined weight of the utility line and snow/ice remains above the resetting threshold. In this case the device will remain in a lowered position, with the springs 22, 23 compressed, until such time as the snow/ice load reduces. This failsafe position is a useful backup. However, in normal operation removal of snow/ice load with release and resetting of the device is expected to be effective.

Figure 1:
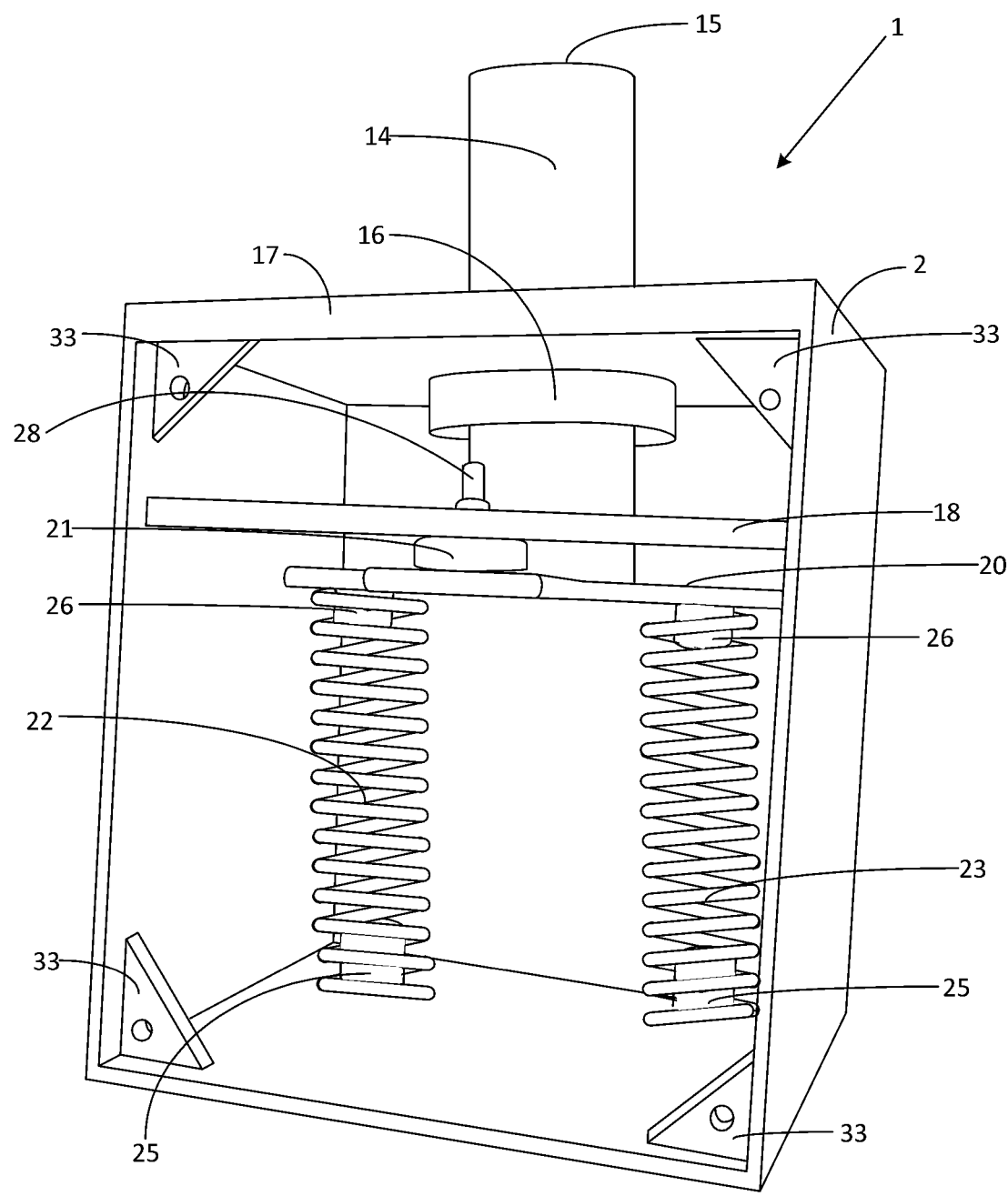
FIG. 1 shows a snow/ice removal device according to one embodiment, in a first position.

As shown in FIG. 1, suitable lugs 25, 26 may be provided for positioning and retaining the ends of the springs 22, 23. Further, in preferred embodiments two springs are provided with opposite coil directions, as shown in FIG. 1. This results in a cancellation of twisting forces applied by each spring. However, in other embodiments different numbers of springs may be used. One spring may be sufficient in some embodiments. An even number of springs may be used in other embodiments, divided into two groups with opposite coil directions. However, in some applications, particularly where lighter weight utility lines are used, a single spring may be used.

The resetting force may be set by suitable selection of springs 22, 23. In some embodiments the resetting force may be adjustable, for example using an adjustment mechanism that moves the base of the spring in or out to alter its compression.

Figure 3:
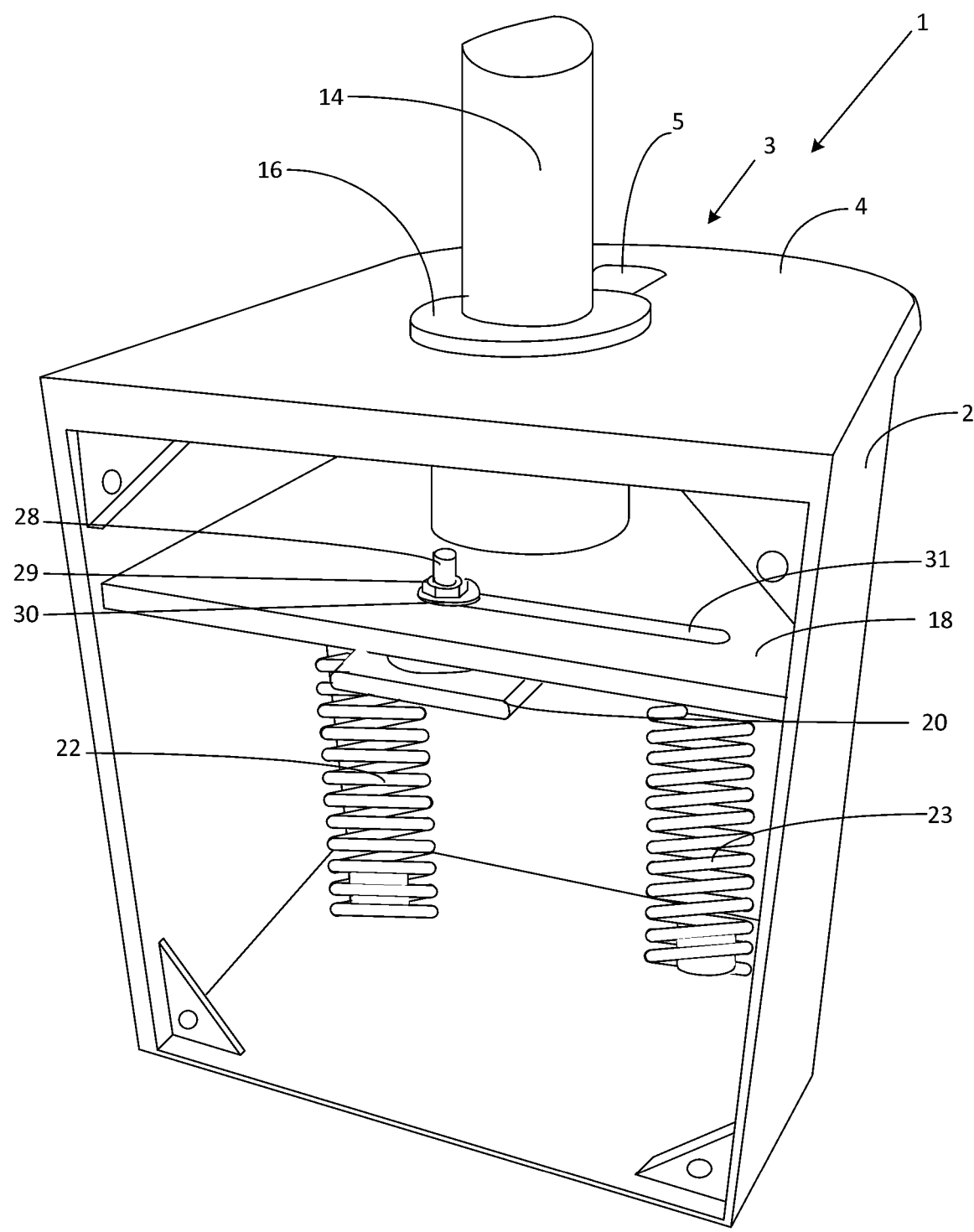
FIG. 3 is a further view of the device of FIG. 1.

The release threshold may also be set by suitable selection of magnet 21. Further, in some embodiments adjustment of the release threshold may be allowed. In FIGS. 1 to 3, the magnet 21 is attached to magnet bearer 18 by a threaded rod 28 and cooperating nut 29 and washer 30 (FIG. 3). Where magnet bearer 18 is formed from a ferromagnetic material the magnet will also be attached to the magnet bearer 18 by its own magnetic force. The threaded rod 28 is free to slide along a slot 31, which alters the alignment of the magnet 21 with the actuation member 20. This adjusts the magnitude of the magnetic force on the actuation member and thereby the release threshold.

The release threshold may be set or adjusted based on one or more of the following factors.

The cable gauge or size will affect the weight applied to the device. A thicker cable will have a higher weight per unit length, and will therefore apply a greater weight force to the device for a given cable length or span than a thinner cable. A greater weight of snow/ice buildup may also be expected due to the larger cable size.

The span or distance between support structures will also affect the weight applied to the device. A longer span will require the device to support a greater length, and therefore weight, of cable. More weight due to snow/ice buildup will also be applied to the device where there are longer utility line spans between support structures.

The release threshold may also depend on the acceptable level of snow/ice buildup for a given application.

The magnet force may also be temperature dependent, so suitable magnets should be selected, or magnet position may be adjusted, in accordance with expected temperatures for a particular application.

By way of example, in one application utility poles may be separated by around 50 meters. The effective span supported by each support structure is therefore also 50 meters. The total utility line weight over that effective span may be around 20 kg for a particular cable thickness. For one application, the release threshold could be set at around 25-30 kg (i.e. the bare utility line weight plus around 5 to 10 kg of snow/ice build-up). The resetting threshold could be set at around 20-22 kg. In very heavy snow this could result in the Applicant's device releasing and resetting up to 3-4 times per hour.

FIGS. 1 to 3 also show corner brackets 33 for mounting of a cover plate. However, a cover plate may be attached in any suitable manner.

The device 1 is preferably enclosed, with all moving parts protected from snow/ice. In the embodiments shown only the moving support extends from the body, with the rest of the mechanism protected within the body.

Figure 5:
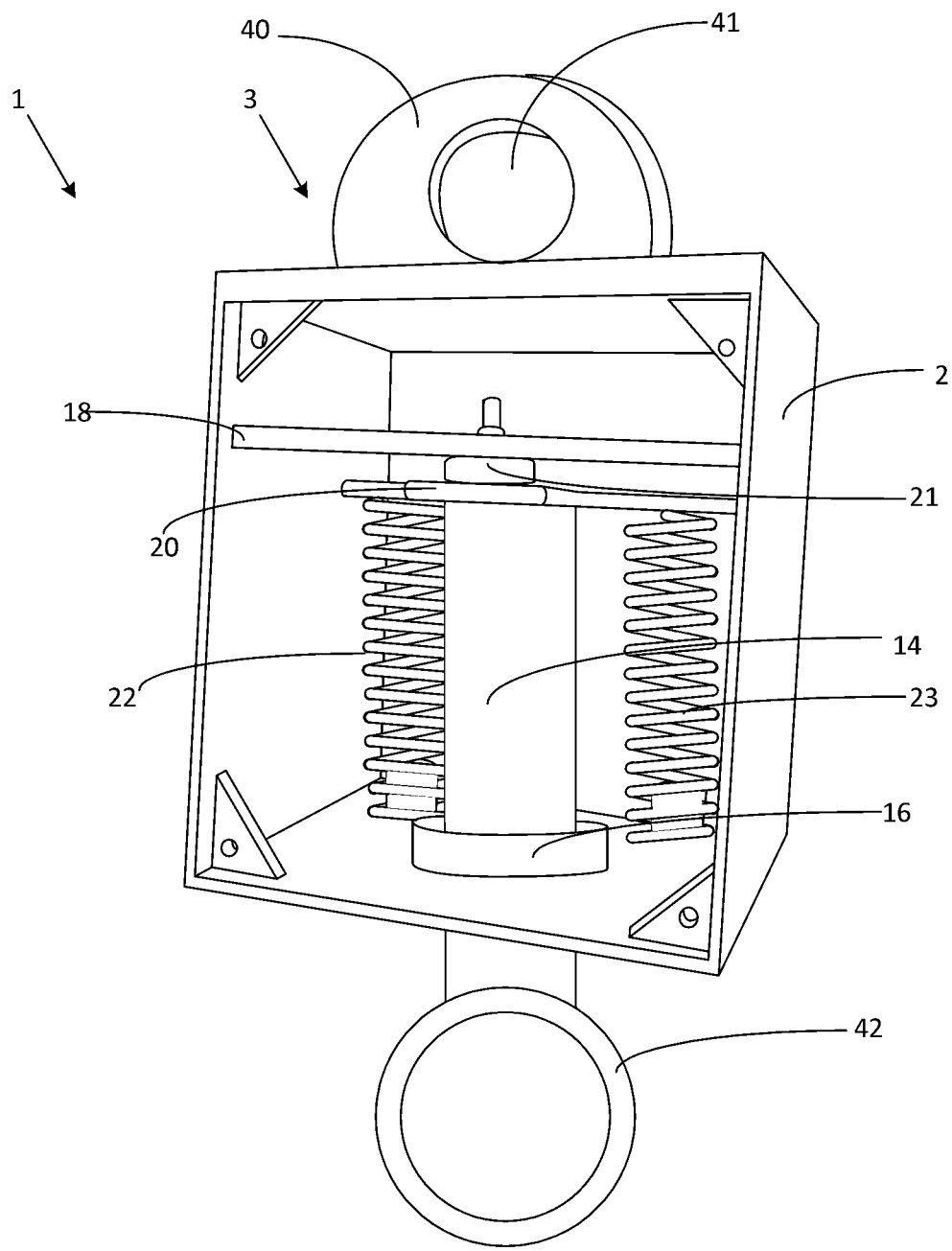
FIG. 5 shows a snow/ice removal device according to another embodiment.

FIG. 5 shows a further embodiment, in which the utility line is carried below the device 1. In this embodiment the mount 3 includes a plate 40 that extends upwards form the body 2. An aperture 41 receives a bolt for attachment to a support structure. In similar embodiments two plates 40 may be provided, to receive a support structure between them.

In this embodiment the moving support 14 extends downwardly from the actuation member through sleeve 16 in a bottom wall of the body 2. An attachment ring 42 allows for attachment of an insulator and utility line to the device 1. In this embodiment the supported position is a raised position, as in FIGS. 1 to 4, with the utility line being allowed to fall under the combined weight of the utility line and any snow/ice buildup when released. The device of this embodiment operates similarly to that of FIGS. 1 to 4.

Figure 6:
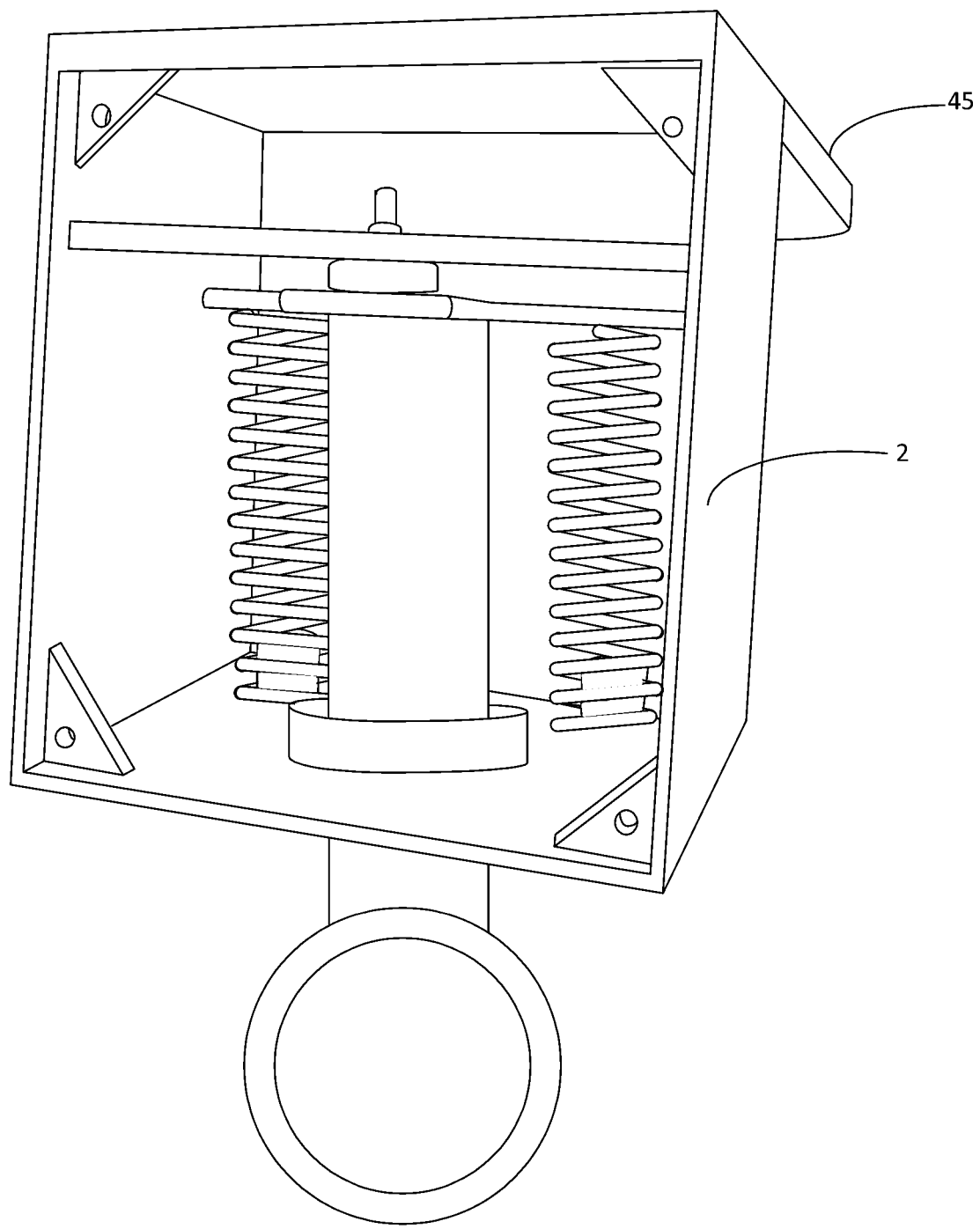
FIG. 6 shows a snow/ice removal device according to a further embodiment.

FIG. 6 shows an embodiment that is similar to FIG. 5, but the mount includes a plate that extends horizontally from the body 2, in a similar manner to the mount of FIG. 3.

Figure 7:
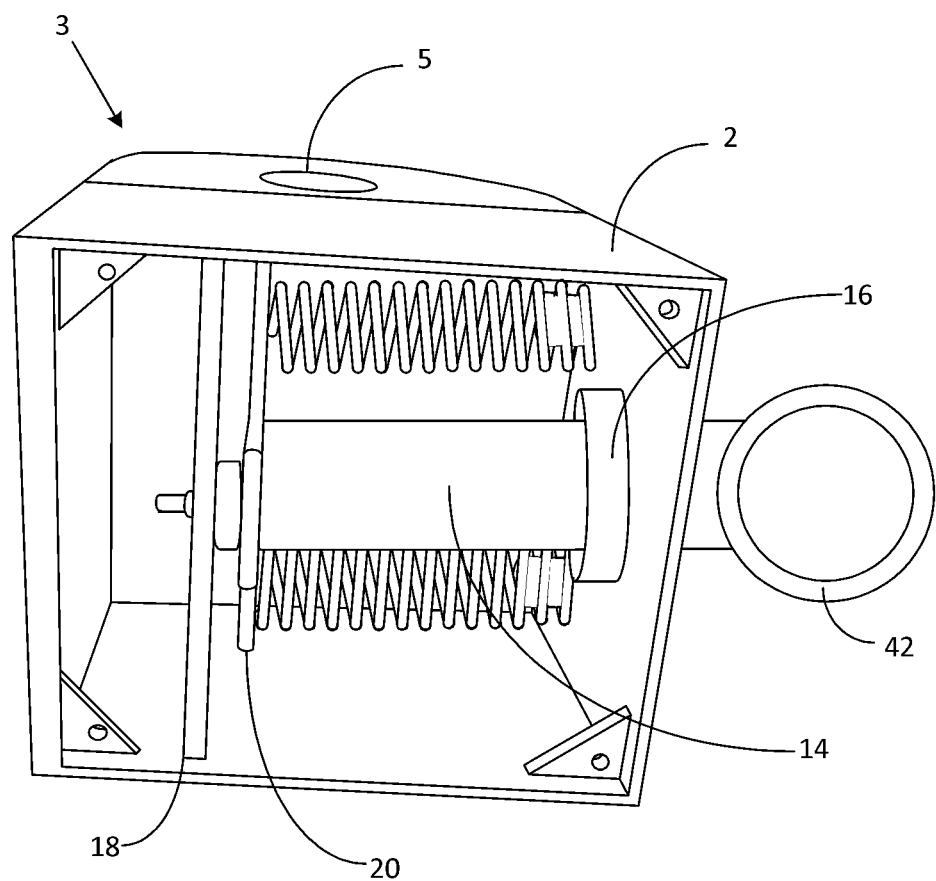
FIG. 7 shows a snow/ice removal device according to another embodiment.

FIG. 7 shows a further embodiment that is functionally similar to FIG. 5, but is arranged with the moving support in the horizontal. In this configuration the utility line is maintained in the supported position and released similarly to the manner described above. The movement of the utility line when it is released is still driven by the combined weight of the utility line and snow/ice buildup. However, here the movement of the end of the utility is between a supported, retracted position, as shown in FIG. 7, and a released, extended position (rather than from a supported, raised position and a released, lowered position as in FIGS. 1 to 4).

Figure 8:
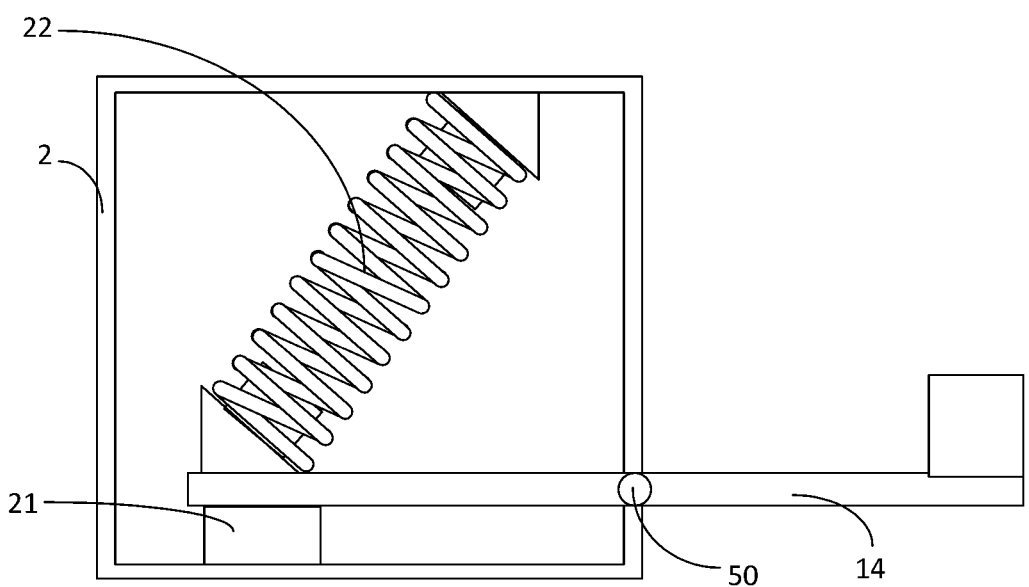
FIG. 8 shows a snow/ice removal device according to yet a further embodiment.

FIG. 8 is a schematic drawings showing a further embodiment in which the sliding linear movement of the moving support 14 is replaced by a pivotal motion around an axis 50. The moving support 14 carries an insulator 51 at an outer end, while an opposite end of the moving support is acted upon by the magnet 21 and spring 22.

Figure 9:
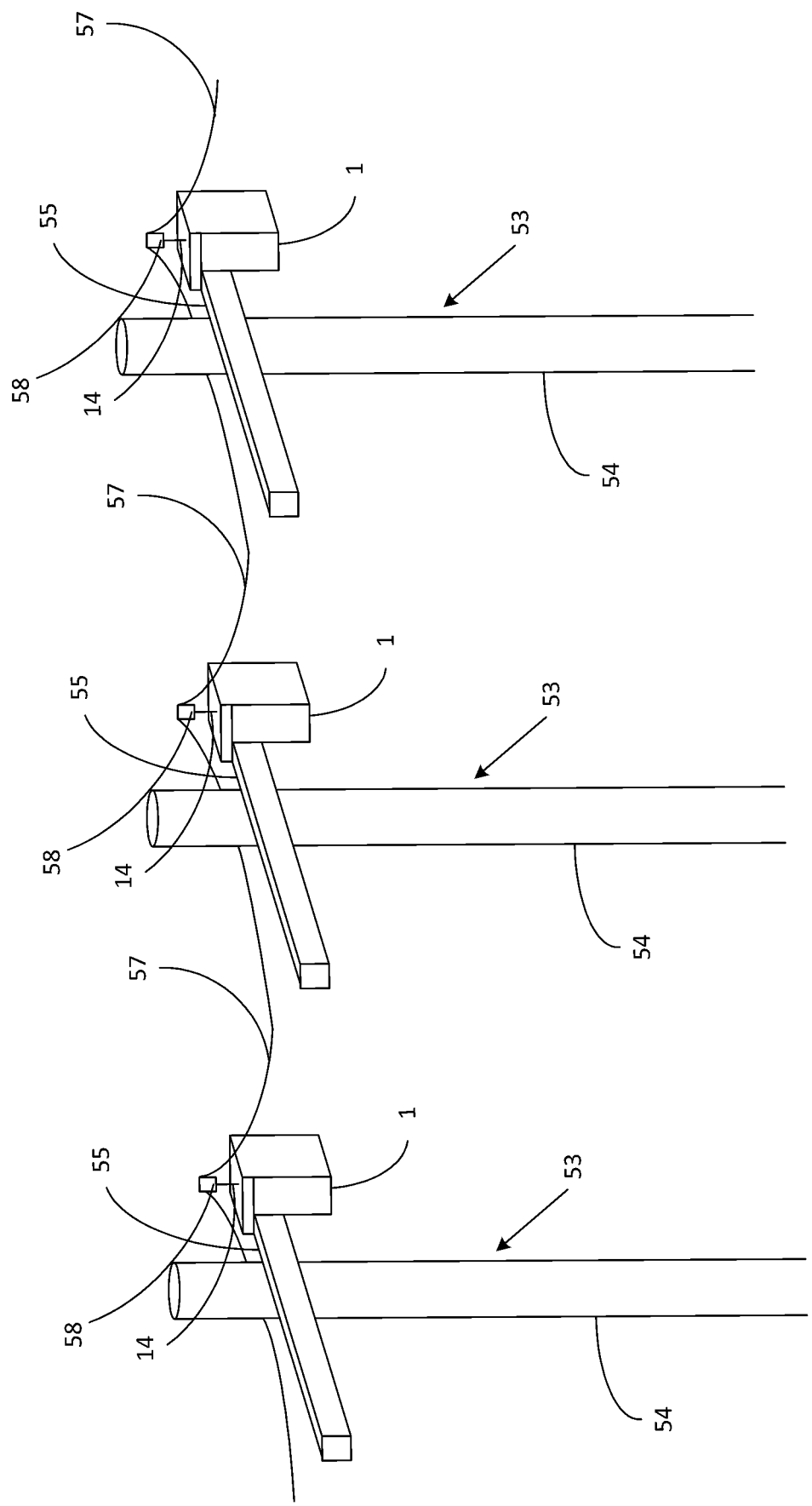
FIG. 9 shows a number of support structures with the Applicant's devices installed thereon, supporting a utility line.

FIG. 9 shows a utility line system including a plurality of support structures 53. In this drawing each support structure 53 is a utility pole 54 with a cross-arm 55. A utility line 57 is carried by the support structures 53. Only one utility line is shown, but the skilled reader will understand that several utility lines can be carried by such support structures. A snow/ice removal device 1 is carried on each cross-arm 55, with an insulator 58 mounted on the moving support 14 of each device 1, and the utility line 57 mounted or attached to each insulator 58.

While this drawing shows a device 1 mounted on each support structure, in some applications a device 1 may be provided on every second support structure. In other applications a device 1 may be provided only on support structures where the increased weight of snow/ice buildup on eth utility lines is expected to be problematic.

While the invention has been described with reference to a device 1 including a single moving support, in some embodiments two or more moving supports may be provided within a single body. That is, the device may be arranged to support two or more utility lines using two or more (preferably independent) mechanisms in a single body.

The body of the device and mounting arrangement may be formed from steel, other suitable metals or alloys, or from suitable plastics. Metal bodies may be welded from plate, cast or manufactured by any other suitable method. Plastics may be moulded or formed by any other suitable process.

Smaller devices made of lighter materials may be suitable where thinner utility lines are used, for example in telecommunications applications.

Components of the device that interact with the magnet may be formed from, or include inserts or other components formed from, any suitable magnetic material, including steel, iron etc.

The magnets used may have various shapes and/or sizes suited to a particular application. Magnet strength should be chosen for a load expected in the particular application (depending on the line weight, desired release threshold etc). Neodymium magnets may be suitable for many applications, but the invention is not restricted to the particular type of magnet used. The Applicant's device may be installed on new utility line installations. The device is also suited to retrofitting on existing support structures and utility lines. In some applications the device may be mounted by removing an existing insulator, installing the device using a bolt through the existing hole used for attaching the insulator, and fitting the insulator to the top of the moving support.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. A utility line snow or ice removal device including:
   i. a body;
   ii. a mount configured for mounting of the body to a support structure;
   iii. a moving support mounted to or in the body and arranged to support a utility line, such that a combined weight of the utility line and any snow or ice on the utility line is borne by the moving support, the moving support having a first position in which the utility line is supported by the moving support in a supported position;
   iv. a magnetic arrangement configured to maintain the moving support in the first position when the combined weight is below a release threshold, wherein, when the combined weight exceeds the release threshold, the magnetic arrangement is configured to release the moving support from the first position to allow the utility line to move under the combined weight from the supported position; and
   v. a resetting arrangement configured to return the moving support to the first position, thereby returning the utility line to the supported position.

2. A device as claimed in claim 1 wherein the moving support is arranged to move vertically, and the supported position is a raised position.

3. A device as claimed in claim 1 wherein the moving support is arranged to move horizontally, and the supported position is a retracted position.

4. A device as claimed in claim 1 wherein the utility lines are electrical power lines, telecommunications lines, Internet lines or cable television lines.

5. A device as claimed in any claim 1 wherein the utility lines are suspended overhead utility lines.

6. A device as claimed in claim 1 wherein the support structure includes a utility pole.

7. A device as claimed in claim 6 wherein the support structure includes a cross-arm mounted on the utility pole and the mount is configured for mounting of the body to the cross-arm.

8. A device as claimed in claim 7 wherein the mount includes at least two perpendicular faces configured to lie against two faces of the cross-arm.

9. A device as claimed in claim 1 wherein the moving support is arranged to support the utility line by supporting an insulator to which the utility line is mounted or attached.

10. A device as claimed in claim 1 wherein the magnetic arrangement includes one or more magnets mounted in the body.

11. A device as claimed in claim 10 wherein at least one of the one or more magnets has an adjustable position, which allows a magnetic force and thereby the release threshold to be adjusted.

12. A device as claimed in claim 10 wherein at least one of the one or more magnets are replaceable to allow the release threshold to be altered.

13. A device as claimed in claim 1 wherein the magnetic arrangement is configured to release the moving support from the first position suddenly.

14. A device as claimed in claim 1 wherein the movement of the utility line under the combined weight from the supported position suddenly releases energy that causes physical movement along the length of the utility line to remove snow and/or ice build-up.

15. A device as claimed in claim 1 wherein the release threshold corresponds to a desired maximum combined weight of the utility line and any snow or ice build-up.

16. A device as claimed in claim 1 wherein the resetting arrangement includes one or more springs to apply a resetting force.

17. A device as claimed claim 16 wherein the resetting arrangement includes an even number of springs to form two groups of springs having opposite coil directions.

18. A device as claimed in claim 16 wherein the resetting arrangement includes two springs having opposite coil directions.

19. A device as claimed in claim 1 wherein the resetting arrangement applies a resetting force that is higher than a weight force applied by the utility line and lower than the release threshold.

20. A device as claimed in claim 1 wherein the device is self-contained and requires no electrical input.

* * * * *